Figure 1:
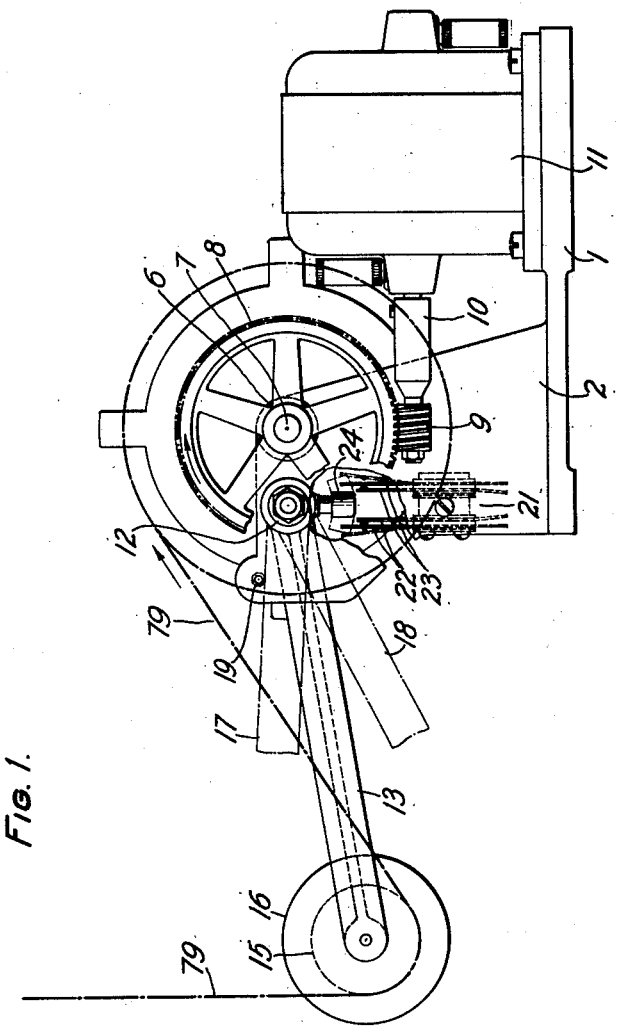

Dec. 22, 1931.   A. H. SHANGLE   1,837,237
TELEGRAPH APPARATUS
Filed Sept. 27, 1928   3 Sheets-Sheet 1

INVENTOR
A. H. SHANGLE
BY
ATTORNEY

Dec. 22, 1931.  A. H. SHANGLE  1,837,237
TELEGRAPH APPARATUS
Filed Sept. 27, 1928  3 Sheets-Sheet 2

INVENTOR
A. H. SHANGLE
BY
ATTORNEY

Dec. 22, 1931. A. H. SHANGLE 1,837,237
TELEGRAPH APPARATUS
Filed Sept. 27, 1928 3 Sheets-Sheet 3
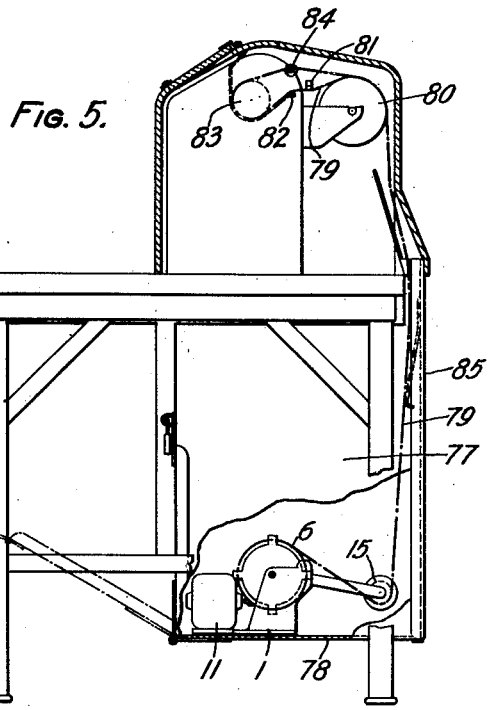
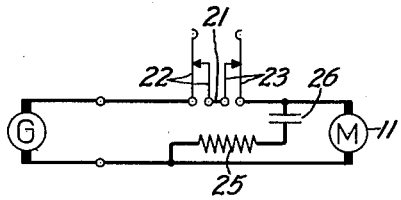
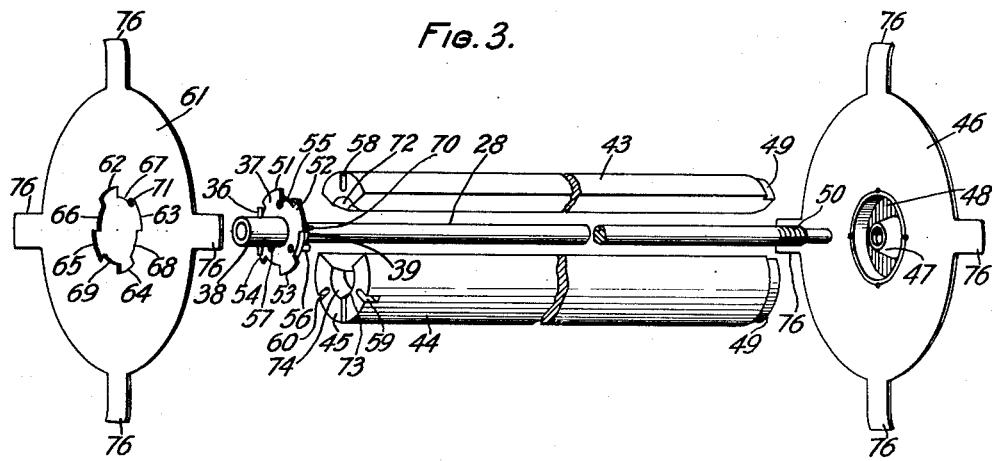
INVENTOR
A. H. SHANGLE
BY
ATTORNEY Patented Dec. 22, 1931

1,837,237

UNITED STATES PATENT OFFICE

AMOS H. SHANGLE, OF ROSELLE, NEW JERSEY, ASSIGNOR TO BELL TELEPHONE LABORATORIES, INCORPORATED, OF NEW YORK, N. Y., A CORPORATION OF NEW YORK

TELEGRAPH APPARATUS

Application filed September 27, 1928. Serial No. 308,594.

This invention relates to secrecy apparatus to be used in combination with a printing telegraph machine where printing of the message in monitoring the operation of the machine and the system to which it is connected is desired.

It is the object of this invention to provide means by which the message record as it enters a locked compartment will be rolled in compact form and storage of a greater length of message record will be possible in a compartment of comparatively small size.

One of the features of this invention is the provision of means for governing the operation of the record storage roller in accordance with the operation of the record printing machine.

Another feature lies in the record storage roller being so constructed that ready removal of the message record rolled thereon may be accomplished.

In printing telegraph systems it is found desirable in order to monitor the operation of the system and machines connected therein to have certain of the printing machines operated under the supervision of inspectors. These machines print a record of telegraph messages coming over the lines of the system. Some of these messages are of a confidential nature and it is the aim of the people in charge of the telegraph system to keep these messages as secret as possible and prevent them from being read by persons unauthorized to receive them. Monitoring printers are accordingly operated under the supervision of certain authorized employees of the telegraph companies who make whatever notations of the operation of the system and machines as is desired. Each monitoring machine is enclosed in a suitable casing which has a window therein so that the authorized employee may watch the printing of the message record.

The message record as it is printed passes into a locked compartment and remains there hidden from view until removed by an authorized employee. The message record upon being removed from the locked compartment is destroyed.

Heretofore message records have been allowed to losely pile up in the locked compartment with the result that the compartment soon becomes filled with the loosely piled up message record and the message record begins to overflow from the compartment and clog up the machine.

This invention remedies this objectionable feature in that it provides means located within the locked compartment for rolling up the message record as it comes from the printing platen of the printing machine.

Figure 2:
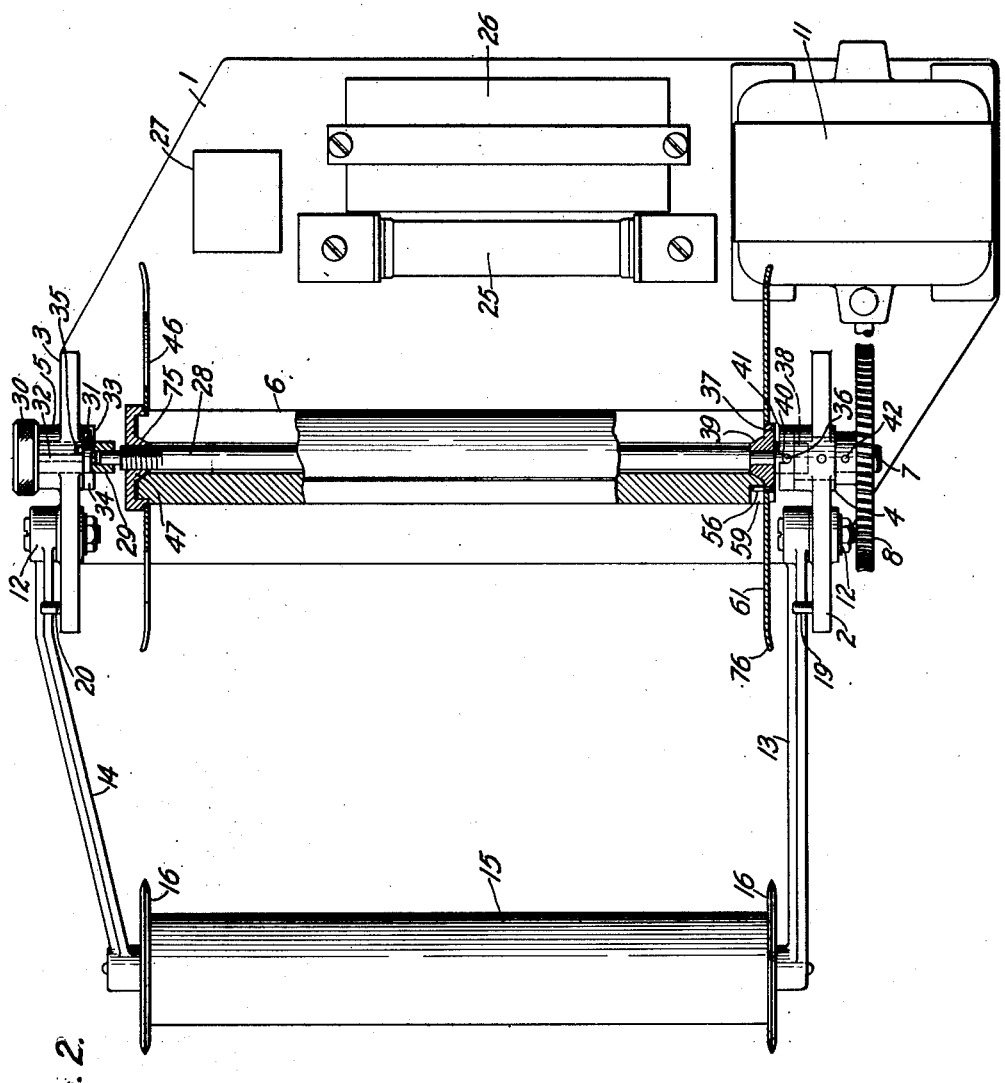

To further describe this invention, reference will be made to the accompanying drawings in which Fig. 1 represents a side view of the message record take-up apparatus; Fig. 2 a top plan view of the same apparatus, Fig. 3 an exploded view of the message record take-up roller; Fig. 4 a circuit diagram showing connections between a source of power and a motor which drives the message record take-up roller and a switch through which operation of the roller is controlled; and Fig. 5 which shows a side view of a monitoring printing machine equipped with apparatus of this invention.

Referring now to the various figures in which like numbers designate like parts, 1 is a substantially flat base plate member having a pair of upright bracket portions 2 and 3 in which are provided hub portions 4 and 5, respectively. Between the hub portions 4 and 5 is supported a message record take-up roller 6. Supported on a small shaft 7 journaled in and extending from the hub portion 4 is a worm wheel 8. The worm wheel 8 is driven through a worm gear 9 and a coupling 10 by a motor 11 which is secured to the base plate 1. Pivotally supported at 12 on the upright bracket portions 2 and 3 are a pair of arms 13 and 14 between which is rotatably supported a jockey roller 15 provided with flange members 16. The arms 13 and 14 are capable of movement up and down to the dotted line positions shown by the broken sections at 17 and 18. Stop pins 19 and 20 are provided on the upright bracket portions 2 and 3, respectively, to limit the upward movement of the arms 13 and 14.

Secured to the inner face of the upright bracket portion 2 is a switch 21 provided with two pairs of spring contacts 22 and 23 which are normally in closed position as shown in solid lines but which may be separated as shown in dotted lines. The separation of these paired contacts is brought about by an insulated knob 24 which is attached to the pivoted end of the arm 13 and is swung across in an arc to the positions shown in dotted lines to separate the spring contacts 22 or 23 when the arms 13 and 14 are moved either upward or downward to the dotted line positions, shown at 17 and 18.

In Fig. 2 the positions of the various elements employed in the support and operation of the message record take-up roller 6 are shown, the base plate 1 with its message record take-up roller supporting brackets 2 and 3, the message record take-up roller 6, the driving motor 11, the arms 13 and 14 and the jockey roller 15 supported thereby which rides on the message record strip and governs the operation of the motor 11 and the message record take-up roller 6. In this figure are also shown mounted on the base plate member 1 a resistance element 25 and a condenser 26 which are connected in series and shunted across the line to protect the switch 21 shown on Fig. 1 from surges of current from the motor 11. A connector block 27 is also shown through which wires of the circuit shown on Fig. 4 are connected.

The message record take-up roller 6 as has been said before is supported between the hub portions 4 and 5 of the upright bracket portions 2 and 3, the rod 28 of the message record take-up roller 6 being journaled at one end in the end of a stem 29 which is supported in the hub 5 of the upright bracket portion 3. The stem 29 has a knurled head 30 and is slid through the hub 5 and secured against accidental dislodgment therefrom by a pin 31. A keyway 32 is provided in the bore of the hub 5 so that the pin 31 on the stem 29 may be passed therethrough. The inner face of the hub 5 is milled half off to provide two ledge portions 33 and 34 for the pin 31 to rest upon when the stem 29 has been turned so that the pin 31 is at right angles to the keyway 32. A slot 35 is also cut downwardly in the inner face of the hub 5 and meets the inner end of the keyway 32, where it forms an offset into which the pin 31 may be moved so that the message record take-up roller 6 may be shifted toward the upright bracket portion 3 and freely rotated while the beginning of a message record strip is being secured to the message record take-up roller 6.

To the other end of the rod 28 of the message record take-up roller 6 is secured by a pin 36, a small flange 37 which has a long hub portion 38 and a cone portion 39. The pin 36 engages a slot 40 in a flat head portion 41 on the shaft 7 which is journaled in the hub 4 and extends through the hub 4 and past the outer face of the upright bracket portion 2 and into the hub of the worm wheel 8 which is pinned thereto at 42.

The message record take-up roller 6 comprises a cylindrical portion which is made up in three sections preferably wood strips 43, 44, and 45 as shown in Fig. 3 which are supported on a rod 28 between a large flange 46 and the small flange 37. The large flange 46 is provided with an internally threaded cone portion 47 which is set in a cup portion 48. This cup portion 48 is made to accommodate reduced end portions 49 of the wood strips 43, 44 and 45 and the internal threading on the cone 47 is provided so that the large flange 46 may be screwed up onto the threaded portion 50 of the rod 28. The small flange 37 has wing portions 51, 52, 53 and 54. Three pins 55, 56 and 57 are provided in the small flange 37 and these pins engage slots 58, 59 and 60 in the wood strips 43, 44 and 45. A flange 61 with cut-out portions 62, 63, 64 and 65 is provided to fit over the small flange 37, wing portions 51, 52, 53 and 54 in the small flange 37, passing through the cut-out portions 62, 63, 64 and 65 in the flange 61. When the small flange 37 is passed through the flange 61, flange 61 is turned so that the wing portions 51, 52, 53 and 54 of the small flange 37 rest on the portions 66, 67, 68 and 69, respectively, of flange 61. A pin 70 on the small flange 37 and a notch 71 on the flange 61 are provided to prevent the movement of the portions 66, 67, 68 and 69 of the flange 61 past the wing portions 51, 52, 53 and 54, respectively, of the flange 37.

In assembling the message record take up roller 6 the wood strips 43, 44 and 45 are clasped about the rod 28 which has the small flange 37 pinned thereon. The pins 55, 56 and 57 of the small flange 37 are fitted into the slots 58, 59 and 60 of the wood strips 43, 44 and 45 and the cone portion 39 is fitted into the counter-sunk portions 72, 73 and 74 of the wood strips 43, 44 and 45. Large flange 46 is then partially screwed onto the rod 28 so that the reduced end portions 49 of the wood strips 43, 44 and 45 are brought partially within the cup 48 and the cone portion 47 is brought partially within counter-sunk portions of the wood strips 43, 44 and 45, shown at 75 in Fig. 2. The flange 61 is then fitted over the small flange 37 and turned so that the wing portions 51, 52, 53 and 54 of the small flange 37 rest on the portions 66, 67, 68 and 69, respectively, of the flange 61 and pin 70 on the small flange 37 engages the notch 71 in the flange 61. Large flange 46 is then turned further onto the thread 50 so that the reduced end portions 49 of the wood strips 43, 44 and 45 are brought fully within the cup 48 and the cone 47 of the large flange 46 and the cone 39 of the small flange 37 are brought fully within the counter-sunk portions which are located at each end of the wood strips 43, 44 and 45. The more the large flange 46 is turned onto the thread 50 the tighter the wood strips 43, 44 and 45 are held and the more the message record take-up roller 6 formed thereby is expanded by the cones 47 and 39. When the large flange 46 is turned back partially off the thread 50, the message record take-up roller 6 is contracted and the flange 61 may be turned and removed therefrom and any message record which has been wound up on the expanded message record take-up roller 6 may be readily removed. The extended portions 76 on the flanges 46 and 61 are provided to guide the printed record onto the message record take-up-roller 6.

The apparatus just described and illustrated as being supported on the base plate member 1 is placed within the compartment 77 of a monitoring printing telegraph machine as shown in Fig. 5 preferably but not necessarily on the floor 78 and suitably secured thereto. An unprinted message record strip 79 is led from a storage roller 80 under a tensioning bar 81 over a paper guide 82 and around the printing platen 83, where the message record is printed. The printed record strip 79 then proceeds over a tensioning roller 84, the storage roller 80 and downward just inside the rear wall of the casing 85 into the compartment 77. The message record strip 79 is passed under the jockey roller 15 and wound on the message record take-up roller 6.

When the jockey roller 15 and the supporting arms 13 and 14 therefor are in normal position shown in Fig. 1 the knob member 24 is touching neither of the paired contact springs 22 or 23 of the switch 21. The paired contact springs 22 and 23 being both closed the circuit as shown in Fig. 4 is closed and the motor 11 operates and turns the message record take-up roller 6 so that the printed message record is wound thereon. As soon, however, as the printed message record 79 has been taken up sufficient to raise jockey roller 15 and supporting arms 13 and 14 to the upper position shown in dotted lines at 17 in Fig. 1, the knob 24 is moved against the longer of the pair of spring contacts 22 and opens the circuit to the motor 11. The motor 11 and the message record take-up roller 6 stop rotating until more of the printed message record 79 moves downward from the printing platen 83 and the jockey roller 15 and supporting arms 13 and 14 are let down to normal position again when the motor 11 will again begin to operate.

Should the message record strip 79 break at any time or all of the record strip be used up, the jockey roller 15 and supporting arms 13 and 14 would be let down to the lower dotted line position shown at 18 in Fig. 1 and knob 24 would be moved against the longer of the pair of spring contacts 23 so that the spring contacts would be separated and the motor circuit opened. The motor 11 would then cease to turn the message record take-up roller 6.

What is claimed is:

1. In a storage device for telegraphic records, a printed record and a take-up unit to wind and store the printed record, said take-up unit comprising a base member, a flanged collapsible roller supported thereon, a motor to drive the roller, and means in engagement with the printed record to control the operation of the motor.

2. In a storage device for telegraphic records, a printed record, a winding unit to roll and store the printed record, said winding unit comprising a collapsible roller member having a plurality of segmental strips forming a cylinder, flange members at each end of the cylinder to hold the segmental strips together, a motor to drive the collapsible roller member and means resting on the printed record to control the operation of the motor.

3. In a storage device for telegraphic records, a printed record, a winding unit to roll and store printed records, said winding unit comprising a base member, spaced supports on the base member, a collapsible spool supported on a rod between said spaced supports, a motor to drive the spool and means supported on said spaced supports and resting on the printed record to automatically start and stop the motor in accordance with respective slackening and tightening conditions of the printed record and to automatically stop the motor when the printed record is severed or completely wound up.

In testimony whereof, I hereunto subscribe my name this 17th day of September, 1928.

AMOS H. SHANGLE.